US011750751B1

(12) United States Patent
Kodimer (10) Patent No.: US 11,750,751 B1
(45) Date of Patent: Sep. 5, 2023

(54) SYSTEM AND METHOD FOR PERSISTENT PRESENTATION OF CLOUD PRINT USER ACCOUNT INFORMATION ACROSS MULTIPLE MFP APPLICATIONS

(71) Applicant: Toshiba TEC Kabushiki Kaisha, Shinagawa-ku (JP)

(72) Inventor: Marianne Kodimer, Huntington Beach, CA (US)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/694,065

(22) Filed: Mar. 14, 2022

(51) Int. Cl.
*H04N 1/00* (2006.01)
*H04N 1/44* (2006.01)

(52) U.S. Cl.
CPC ..... *H04N 1/00244* (2013.01); *H04N 1/00413* (2013.01); *H04N 1/00474* (2013.01); *H04N 1/00514* (2013.01); *H04N 1/4433* (2013.01); *H04N 2201/0094* (2013.01)

(58) Field of Classification Search
CPC ........... H04N 1/00244; H04N 1/00413; H04N 1/00474; H04N 1/00514; H04N 1/4433; H04N 2201/0094
See application file for complete search history.

(56) References Cited

U.S. PATENT DOCUMENTS

| | | | | |
|---|---|---|---|---|
| 7,720,742 B1* | 5/2010 | Mauro | ................... | G06Q 40/06 705/37 |
| 10,827,092 B1* | 11/2020 | Bier | ....................... | H04N 1/344 |
| 2016/0364723 A1* | 12/2016 | Reese | ................ | G06Q 20/4012 |
| 2021/0067481 A1* | 3/2021 | Su | ........................... | H04W 4/16 |
| 2021/0243332 A1* | 8/2021 | Zhang | .................. | G06F 3/1203 |

* cited by examiner

*Primary Examiner* — Juan M Guillermety
(74) *Attorney, Agent, or Firm* — Ulmer & Berne LLP; John X. Garred (57) ABSTRACT

A system and method for persistent presentation of cloud print user account information across multiple multifunction peripheral applications includes a user allowance appliance within a print management system that presents the user's status, considering all print management functionality of the multifunction peripheral regardless of which application is issuing a status, to maintain a persistent presentation of the user's status globally that includes functional permissions, allowance, job cost, and funds remaining. This status region is independent of any one application and is updated in real time to keep the user informed of the current state of their account information. The presentation is context sensitive such that status relevant to an active application is also shown.

20 Claims, 7 Drawing Sheets

My Prints  ✕

○ Select All 21 jobs (1 selected)    [ Print ]

● DocumentName this is the name of the long named documentout...pdf
  5 pages  04/05/2022      1copy | Color | 1 sided | $ 0.50  ›   🗑

○ DocumentName.pdf
  5 pages  02/08/2022      1copy | Color | 1 sided | $ 0.50  ›   🗑

○ DocumentName.pdf
  5 pages  04/05/2022      1copy | Color | 1 sided | $ 0.50  ›   🗑

○ DocumentName.pdf
  5 pages  01/06/2022      1copy | Color | 1 sided | $ 0.50  ›   🗑

○ DocumentName.pdf
  5 pages  09/05/2022      1copy | Color | 1 sided | $ 0.50  ›   🗑

○ DocumentName.pdf
  5 pages  02/06/2022      1copy | Color | 1 sided | $ 0.50  ›   🗑

🖶 Print 22 Jobs in My Prints    Cost $.50 / $100.00 Available ▼    ↦ Logout John Smith

My Prints  ✕

○ Select All 21 jobs (1 selected)    [ Print ]

● DocumentName     ...pdf
  5 pages  04/05/2022

○ DocumentName
  5 pages  02/08/2022        Your Balance  $100.00
                             Job Cost      $   0.50
○ DocumentName                              ─────────         704
  5 pages  04/05/2022        New Balance   $  99.50

○ DocumentName
  5 pages  01/06/2022     ─────────────────────────────

Original Quota Values | Remaining Allowances
○ DocumentName            1000 B&W Print        | 100 B&W Print
  5 pages  09/05/2022     1000 Color Print      | 100 Color Print
                          Unlimited Scan        | Unlimited Scan
○ DocumentName            Unlimited Fax         | Unlimited Fax
  5 pages  02/06/2022

🖶 Print 22 Jobs in My Prints    Cost $.50 / $100.00 Available ▼    ↦ Logout John Smith

SYSTEM AND METHOD FOR PERSISTENT PRESENTATION OF CLOUD PRINT USER ACCOUNT INFORMATION ACROSS MULTIPLE MFP APPLICATIONS

TECHNICAL FIELD OF THE INVENTION

This application relates generally to printing. The application relates more particularly to print job accounting with multifunction peripherals operating in conjunction with cloud services.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

BRIEF DESCRIPTION OF THE DRAWINGS

Various embodiments will become better understood with regard to the following description, appended claims and accompanying drawings wherein:

DETAILED DESCRIPTION OF THE INVENTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Cloud document servers may function as print management servers that allow for print management, such as cost accounting and quota management which may be accomplished with a system such as PaperCut or SkyPrint. It is understood that any suitable networked print management system can be used. Print management systems provide an application that, once installed onto an MFP, manage print tasks, and optionally provide user feedback regarding current status, allowance, and job costs.

Example embodiments herein provide implementation of a background application component of a print management application or application suite that provides user feedback regarding the user's status, allowances, privileges, and job costs separate from the application in focus. The background application communicates with one or more servers to maintain status and show cost in real time as the user interacts with different functions of the same eApp or more than one eApp that is under cost management control.

With current systems, user feedback is shown within an application itself, appearing only when the application is invoked. Example embodiments herein show status, and account balance as it pertains to any or each of applications under user job management.

Cloud document servers also function for web based services, such as with Microsoft OneDrive, Google Drive and Dropbox. MFP applications, referred to as eApps, meld MFP functions with those of cloud document servers. Example eApps may comprise operations such as scan to OneDrive, print from Google drive or fax from Dropbox. MFP operations, including operations associated with eApps, are frequently associated with fees or quotas.

Figure 1:
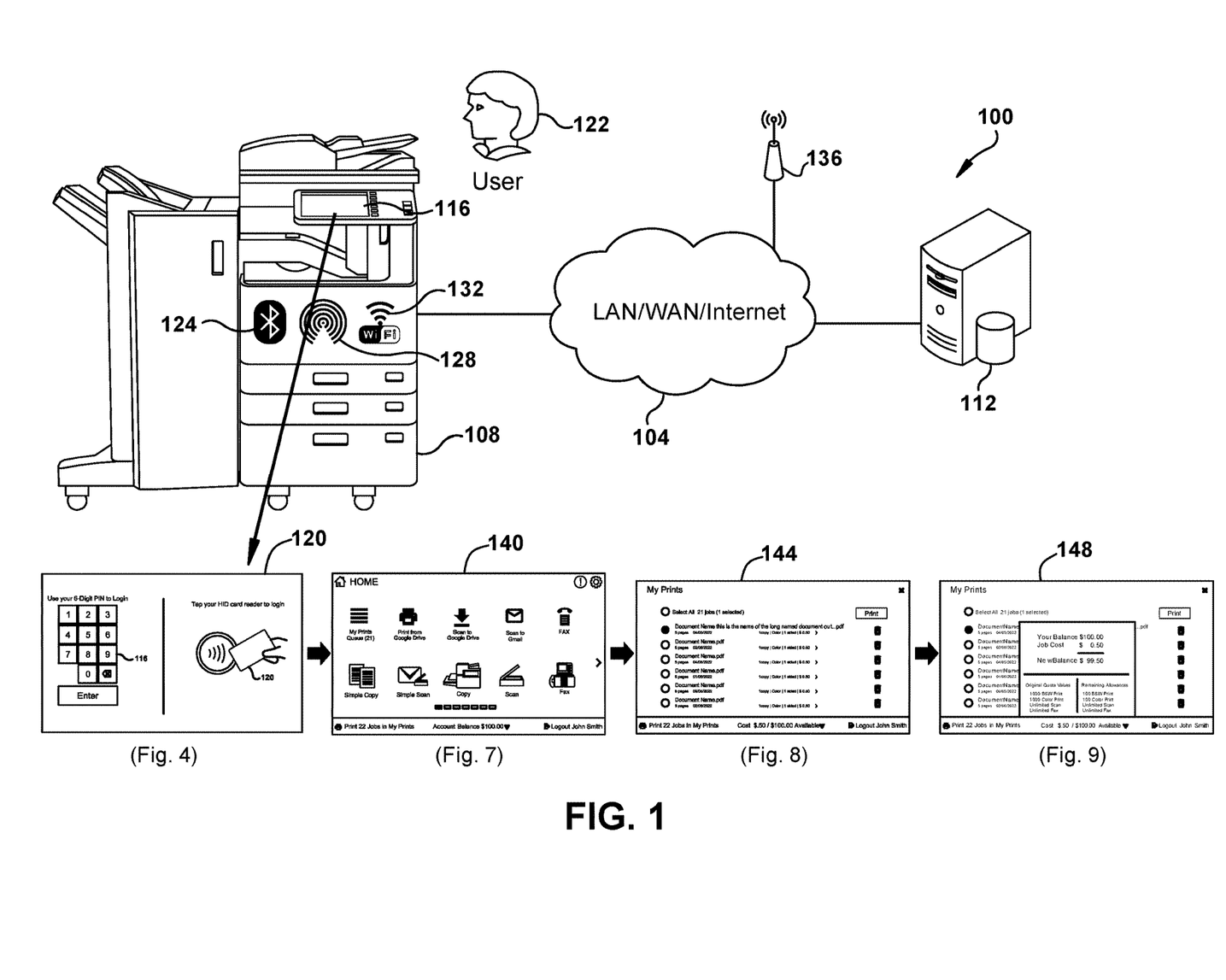
FIG. 1 is an example embodiment of a system for persistent presentation of cloud print user account information across multiple multifunction peripheral applications.

FIG. 1 illustrates an example embodiment of a system 100 for persistent presentation of cloud print user account information across multiple MFP applications. Included in FIG. 1 is network cloud 104 suitably comprised of a local area network (LAN), a wide area network (WAN), which may comprise the Internet, or any suitable combination thereof. Network cloud 104 is comprised of any suitable wireless or wired data connection or combination thereof. Network cloud 104 provides a data connection between MFP 108 and network cloud document server 112.

MFP 108 includes a user interface, such as touchscreen 116 that displays an authentication screen 120 for user sign in by user 122, suitably via entry of a PIN code or by reading a proximity card, for access to MFP functions. Further details relative to authentication screen 120 follow with reference to FIG. 4, below. MFP 108 also suitably includes wireless data communication, such as via Bluetooth 124, RFID 128 and Wi-Fi 132 which may communication with network cloud 104 via hotspot 136. Authentication and job accounting is suitably accomplished via one or more cloud servers, such as server 112. Also, eApps may employ server 112 functioning as a cloud document service server. Applications that invoke MFP native functions may be referred to as apps or native applications.

User account or status information may include account balances, permissions quotas, job costs or device features associated with user 122. Cloud based printing systems may provide server-less printing, as well as job management and task accounting. Rules can be put in place to enforce job permissions and quota-based allowances. Job accounting and cost accounting can be managed and stored in the cloud such that multiple MFPs can be used by the user and managed by the system. A user interface of such systems show end user provisions within an eApp or embedded MFP application, including job cost, feature allowance, and other status information. In a typical system, a user accesses their status information on status screens. A problem is that when a print management system generates a display that accounts for all copier features, counts that are issued via other apps or eApps, as well as main copier functionality are lost.

Example embodiments herein provide a MFP global end user allowance eApp within a print management system that presents a user's status, considering all print management functionality of the MFP regardless of the issuing app or eApp, to maintain a persistent presentation of the user's status globally that includes functional permissions, allowance, job cost, and funds remaining. This status region is independent of any one app and is updated in real time to keep the user informed of the current state. Further, the eApp and presentation is context sensitive such that status relevant to the active app, such as job cost, is also shown. This is illustrated in conjunction with interface screens 140, 144 and 148, detailed below in connection with FIGS. 7-9, respectively.

Figure 2:
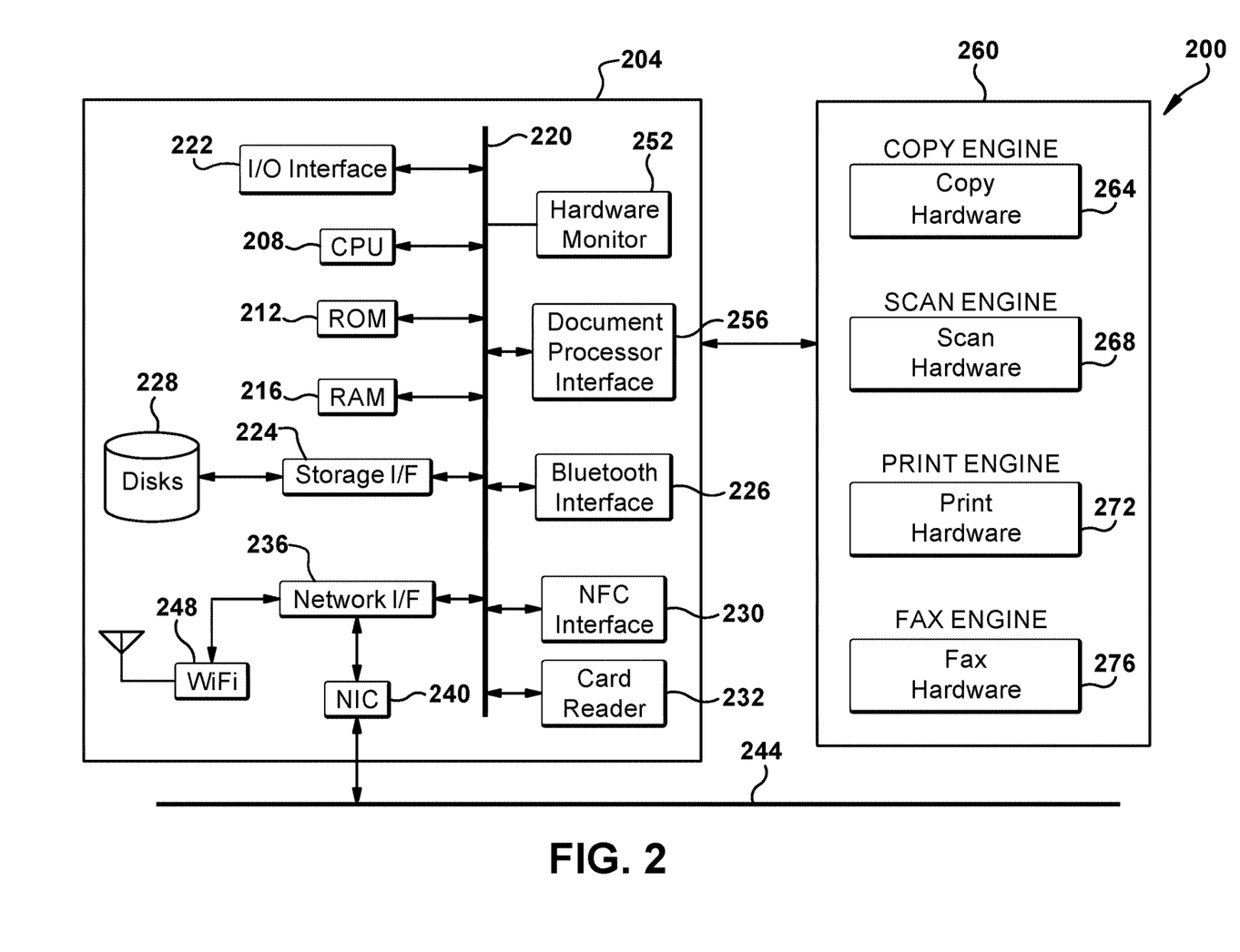
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 108 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with input/output interface 222, suitably comprising a user touchscreen. While touchscreens are discussed in example embodiments herein, it is to be appreciated that any suitable user interface, such as keyboards, switches, displays, trackballs or mice may be used.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with additional interfaces, such as Bluetooth interface 226, NFC interface 230 and card reader 232 for data exchange with proximity cards, such as card keys.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless network interfaces include optical, cellular, Wi-Fi, wireless universal serial bus (wireless USB), satellite, and the like. Example wired interfaces include Ethernet, USB, IEEE 1394 (Fire-Wire), Lightning, telephone line, or the like.

Processor 208 can also be in data communication with any suitable user input/output (I/O) network interface 222 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a scan engine comprising copy hardware 264, a scan engine comprise of scan hardware 268, a print engine comprised of print hardware 272 and a fax engine comprised of fax hardware 276 which together comprise document rendering system 260. It will be understood that functional units are suitably comprised of intelligent units, including any suitable hardware or software platform.

Figure 3:
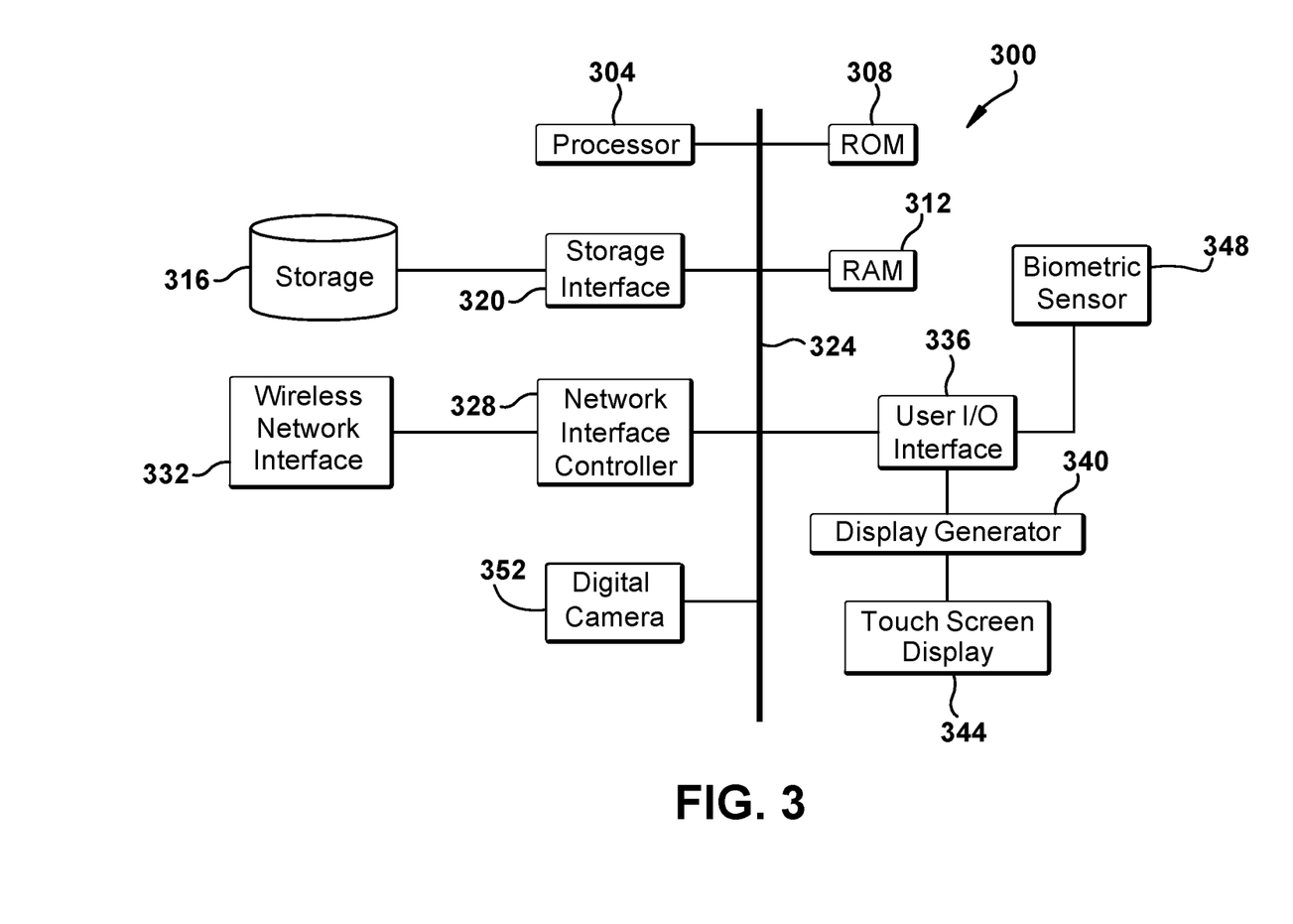
FIG. 3 is an example embodiment of a digital device system.

Turning now to FIG. 3, illustrated is an example embodiment of a digital data processing device 300 such as server 112 of FIG. 1. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used. Processor 304 processor is also in data communication with a digital camera 352 via interface 336.

Figure 4:
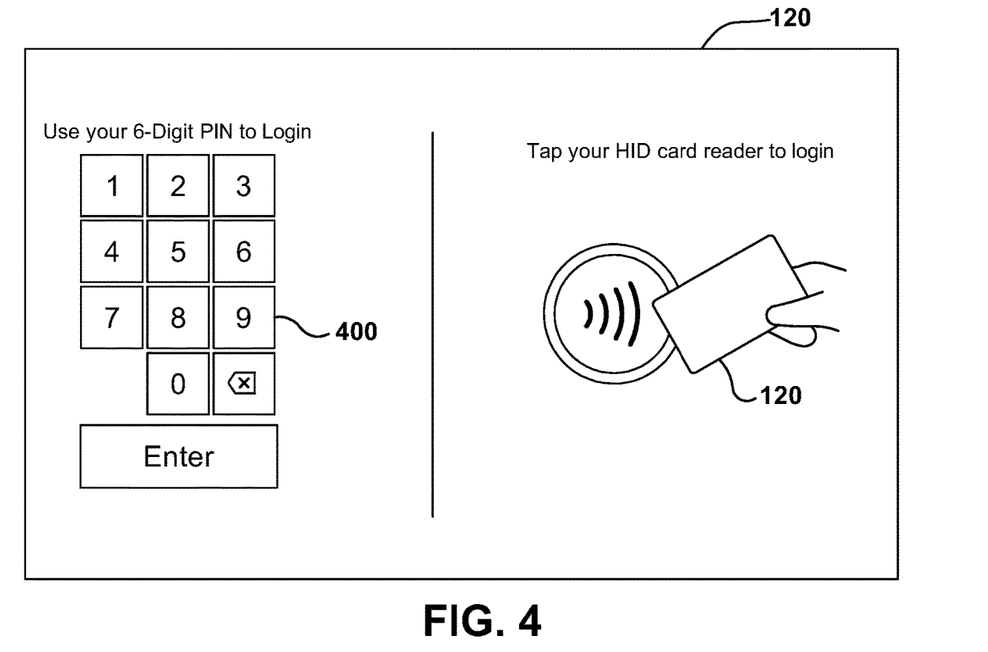
FIG. 4 is an enlarged view of authentication screen 120 of FIG. 1.

FIG. 4 is an enlarged view of authentication screen 120 of FIG. 1. The screen displays touchscreen keypad 400 for PIN code entry. Entry of a valid PIN code allows for identification of an identified, authorized user and facilitates access to MFP functionality. Identification is also suitably done with a proximity device such as a RFID or HID card key 126 that is brought in close proximity to authentication screen 120. Authentication is may also be done via alternatives such as Bluetooth or Wi-Fi direct. Once a user is logged in, they are associated with their account information.

Figure 5:
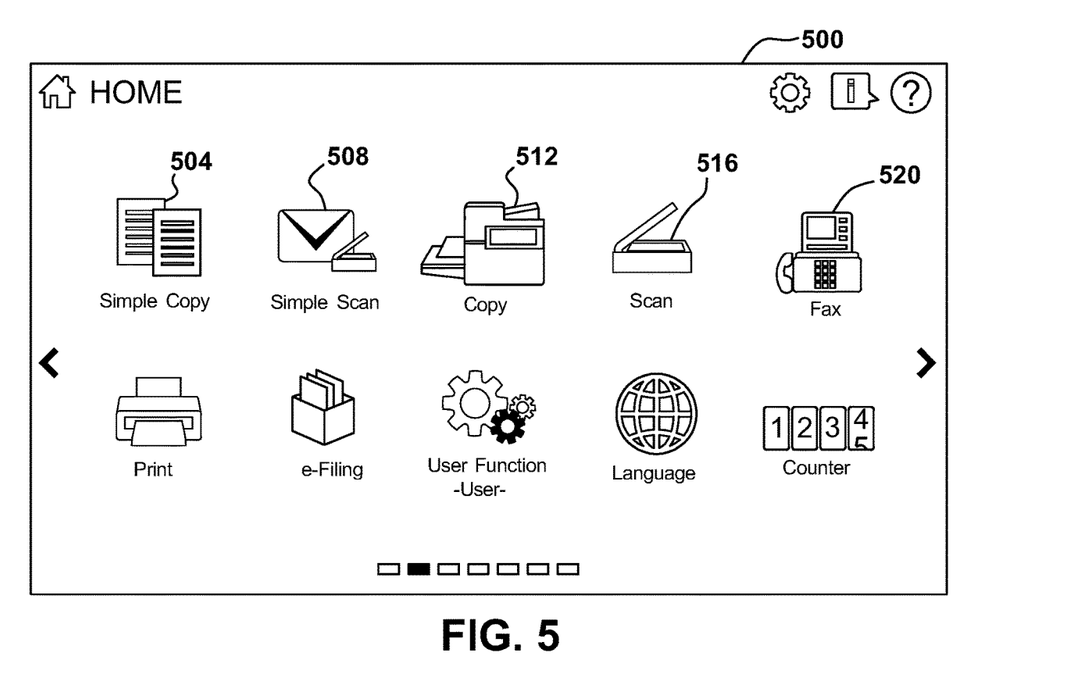
FIG. 5 is an example embodiment of a default display screen on a multifunction peripheral user interface.

FIG. 5 comprises MFP display screen 500, which may be a default MFP user interface. Indicia, such as icons, are provided for device functionality such as by invoking an app to provide a desired MFP operation. Example, selectable apps include simple copy 504, simple scan 508, copy 512, scan 516 and fax 520. Simple scans and simple copies may return scanned or copied content without associated formatting.

Figure 6:
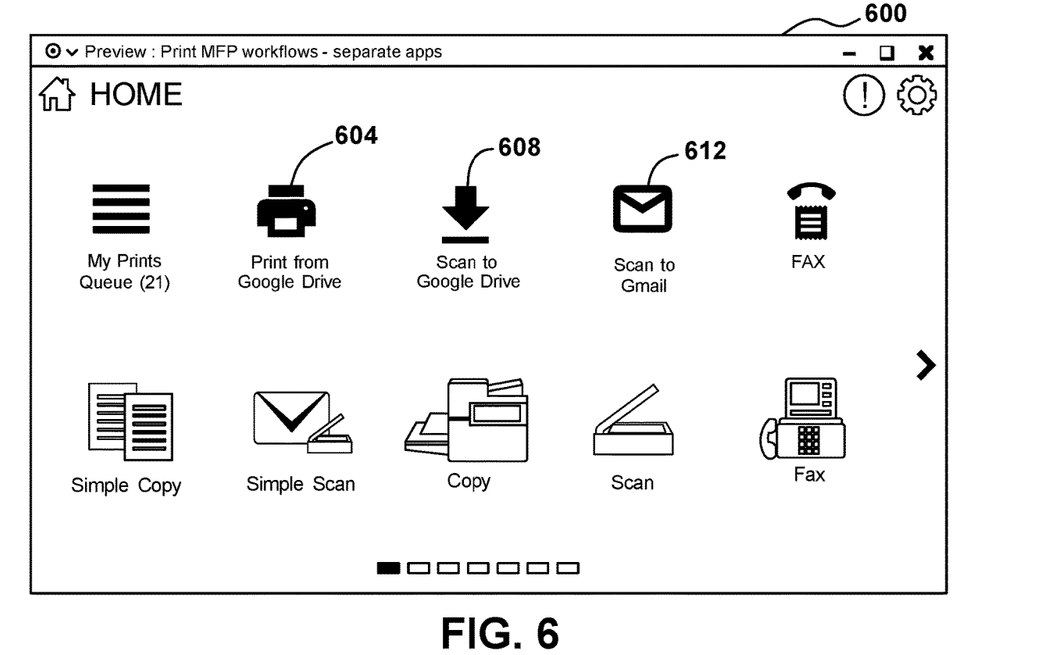
FIG. 6 is an example embodiment of a multifunction peripheral display screen showing selectable applications which integrate device functionality with web services.

FIG. 6 comprises MFP display screen 600. Indicia, such as icons, are provided for MFP/Cloud Server functionality such as by invoking an eAapp to provide a desired MFP operation cooperatively with a cloud service. Example, selectable eApps include print from Google Drive 604, scan to Google Drive 608 and scan to Gmail 612.

Figure 7:
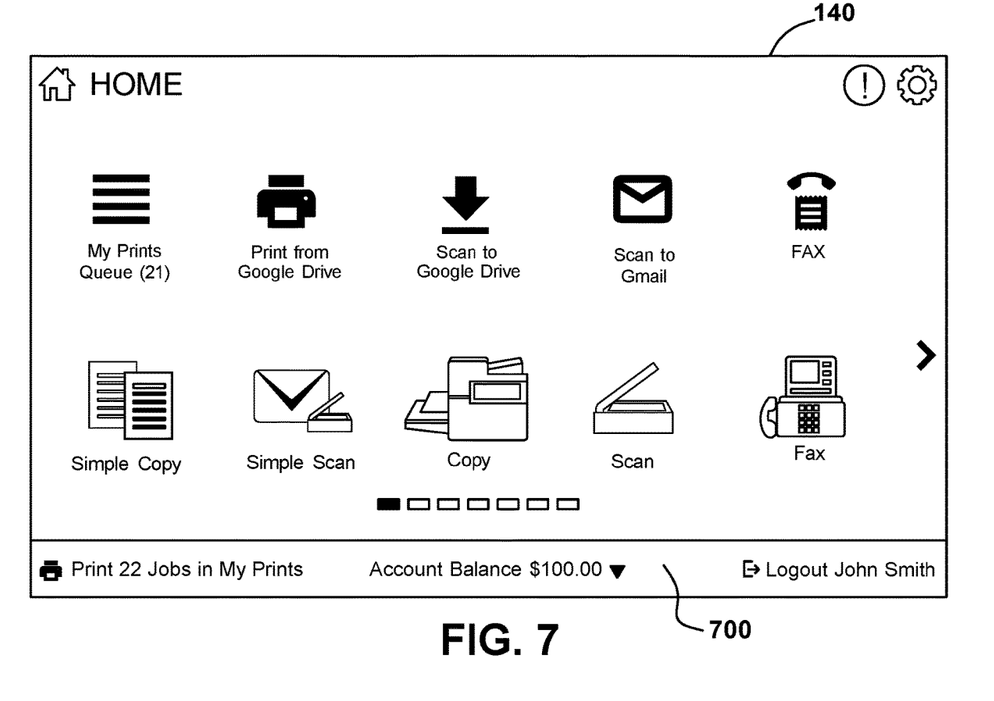
FIG. 7 is an example embodiment of a multifunction peripheral display screen showing a persistent account balance bar displaying account information associated with multiple applications.

FIG. 7 shows MFP screen 140 with a persistent, anchored account information bar 700 that aggregates and updates information for user John Smith across multiple apps and eApps. MFP apps and eApps are available for selection while the information bar is present. Selection of apps or eApps results in an update of the account information.

Figure 8:
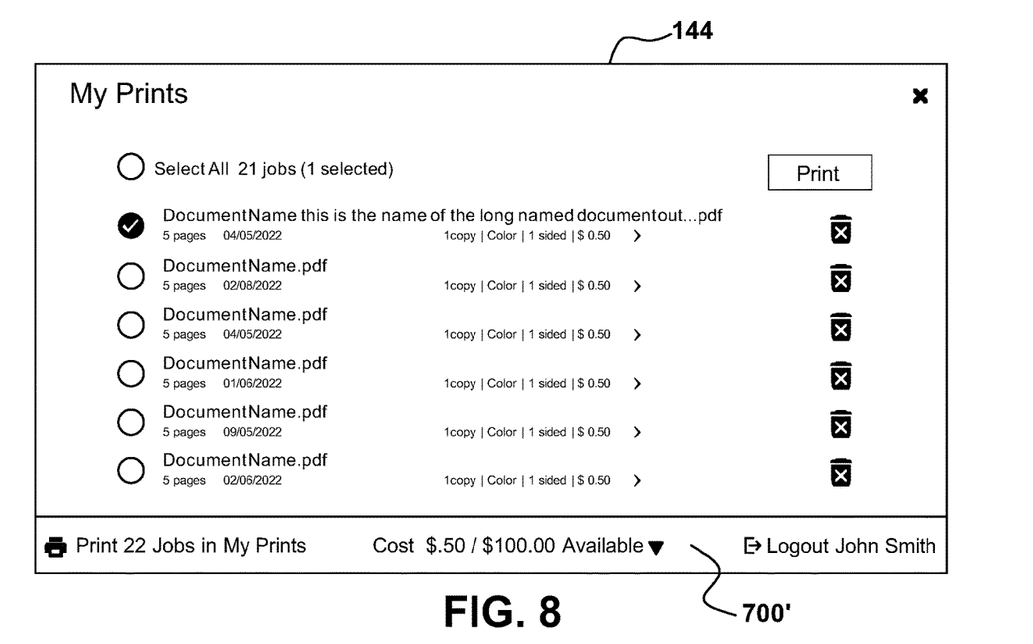
FIG. 8 is an example embodiment of a multifunction peripheral screen which maintains a status bar after an application is invoked.

FIG. 8 shows MFP screen 144 which maintains status bar 700' after an app is invoked from screen 140 of FIG. 7.

Figure 9:
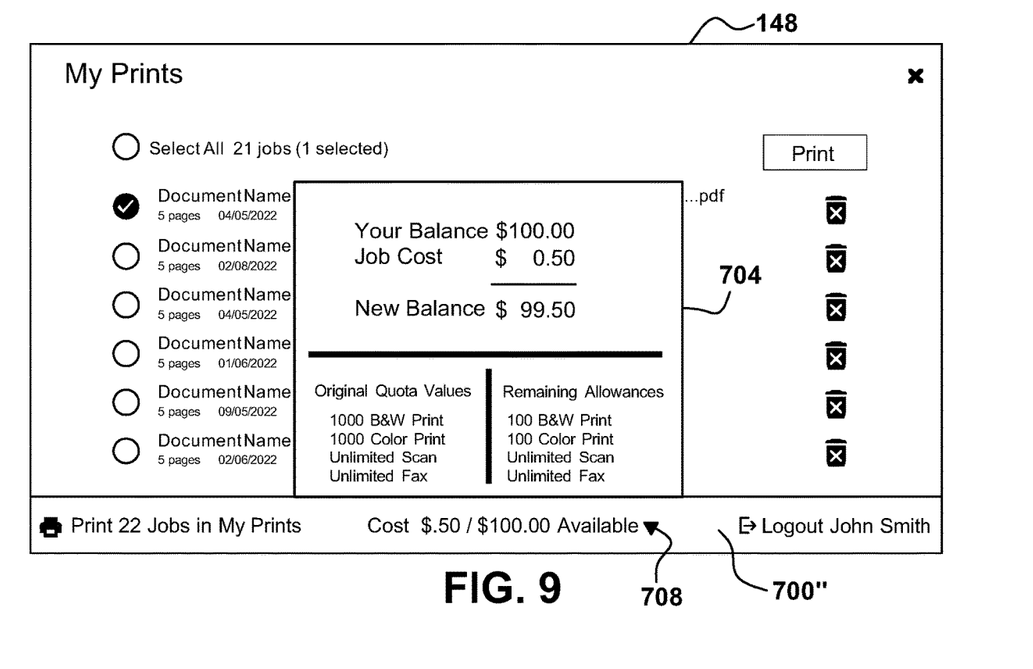
FIG. 9 is an example embodiment of a multifunction peripheral screen which maintains a status bar while showing a display of the user's account details.

FIG. 9 shows MFP screen 148 which maintains status bar 700" while showing a display of the user's account details 704, suitably generated by user selection of arrow 708. Such details are displayed while maintaining content as depicted in FIG. 8, above.

Figure 10:
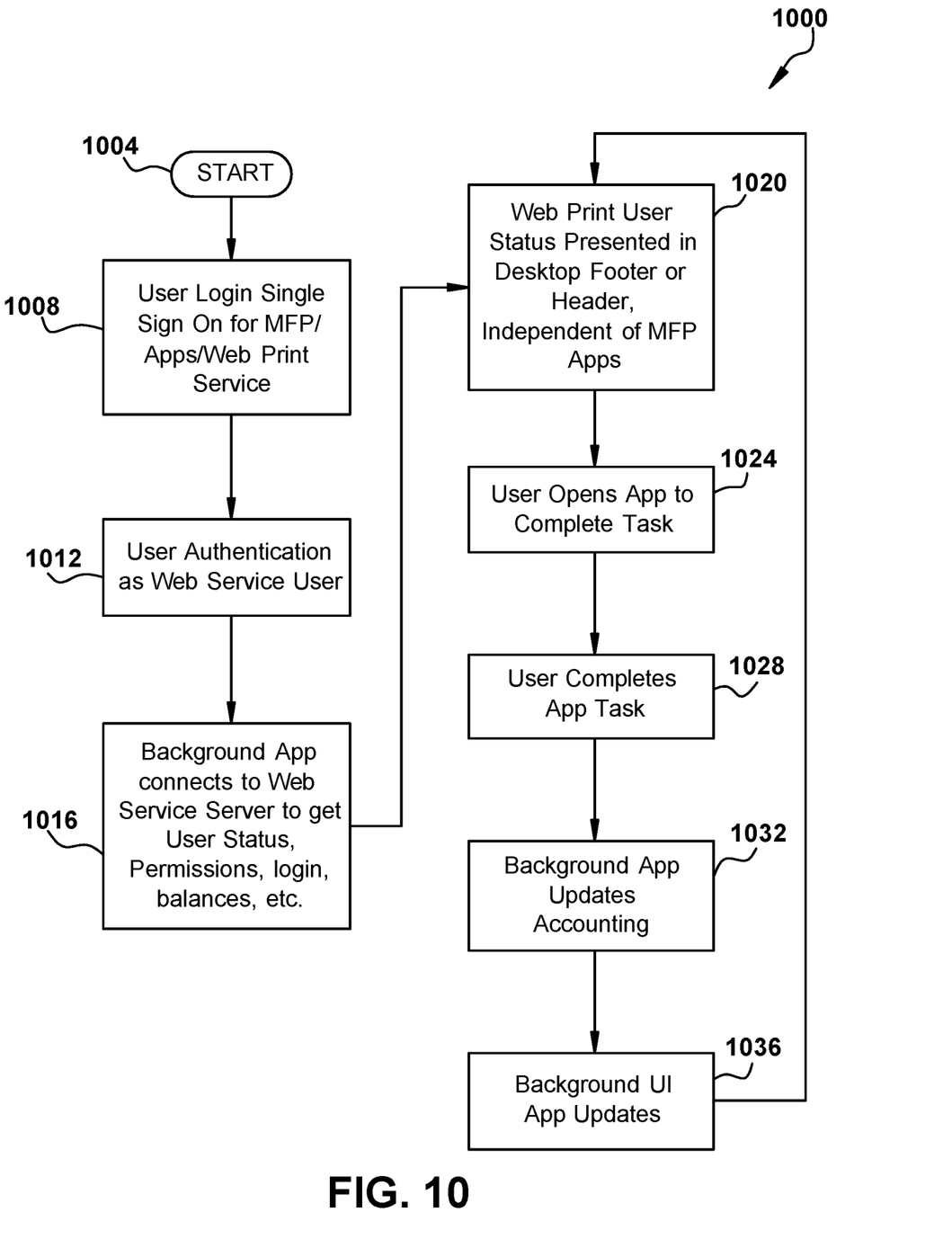
FIG. 10 is an example embodiment of a flowchart for a system for persistent presentation of cloud print user account information across multiple applications.

FIG. 10 is a flowchart 1000 of a system for persistent presentation of cloud print user account information across multiple applications. The system commences at block 1004 and proceeds to block 1008 where a user logs in to an MFP as a single sign in to invoke device functions and web print services via selection of apps or eApps. The user is authenticated as a web service user at block 1012. Next, at block 1016, a background app is used to connect to one or more web service servers to obtain user information, such as status, permissions, or login information, permissions or balances. A summary user status bar is generated at block 1020 and presented in a display header or footer, operating independently of MFP apps, or eApps.

Next, the user completes one or more app or eApp tasks at block 1028. The background app then updates the users account information at block 1032, which in turn updates the user's status, which then updates the status bar display at block 1020 until a new app or eApp is invoked.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   one or more document processing engines including a copy engine, a scan engine, a print engine or a fax engine;
   a user interface including a user interface display and a user input;
   a network interface;
   memory storing a plurality of cloud service applications, the plurality of cloud service applications configured to complete a document processing operation cooperatively between a cloud document service and the one or more document processing engines;
   a processor configured to show selectable indicia on the user interface display corresponding to of each of the plurality of cloud service applications;
   the processor configured to receive a login from an associated user via the user interface;
   the processor further configured to authenticate, responsive to the login, the associated user with each of a plurality of fee based cloud document services via the network interface and its associated cloud service application;
   the processor further configured to receive status data associated with the user from each authenticated cloud document service via the network interface;
   the processor further configured to consolidate the received status data for the user from each authenticated cloud document service;
   the processor further configured to show consolidated status data for the user on the user interface display concurrently with the selectable indicia;
   the processor further configured to receive an instruction initiating one or more cloud service applications in accordance with user selection of its associated indicia;
   the processor further configured to execute each initiated cloud service application in connection with an associated cloud document service;
   the processor further configured to update the consolidated status data in accordance with each executed cloud service application; and
   the processor further configured to show updated consolidated status data on the user interface display concurrently with the selectable indicia.

2. The system of claim 1 wherein the plurality of cloud service applications comprise two or more of printing from a cloud service, scanning to a cloud service, faxing to a cloud service and emailing from a cloud service.

3. The system of claim 2 wherein the processor is further configured to generate a persistent status bar on the user interface display wherein the consolidated status data is shown in the persistent status bar and updated to show the updated consolidated status data in the persistent status bar.

4. The system of claim 3 wherein the processor wherein each cloud service application is associated with an eApp, and wherein eApps are executed by a user selection of its associated indicia.

5. The system of claim 4 wherein the selectable indicia includes associated indicia, the associated indicia being associated each of a plurality of native applications, each native application associated with document processing application completed by the one or more document processing engines, and wherein the processor is further configured to:
   receive an instruction initiating one or more native applications in accordance with the user selection of the associated indicia;
   execute each initiated native application;
   update the consolidated status data in accordance with each executed native application service application; and
   show the updated consolidated status data on the user interface display concurrently with the selectable indicia.

6. The system of claim 5 wherein native applications include one or more of a simple copy, a simple scan, a copy, a scan and a fax.

7. The system of claim 6 wherein the status data comprises one or more of an account balance and document processing quotas associated with the user.

8. The system of claim 7 wherein the updated consolidated status data includes one or more of an updated account balance and updated document processing quotas associated with the user in accordance a cost of an executed cloud application or an executed native application.

9. A method comprising:
   storing a plurality of cloud service applications in a memory, the plurality of cloud service applications configured to complete a document processing operation cooperatively between a cloud document service and one or-more document processing engines;
   showing selectable indicia on a user interface display corresponding to of each of the plurality of cloud service applications;
   receiving a login from an associated user via the user interface display;
   authenticating a user, responsive to the login, with each of a plurality of fee based cloud document services via a network interface and its associated cloud service application;

receiving status data associated with the user from each authenticated cloud document service via the network interface;

consolidating the received status data for the user from the authenticated cloud document service; showing consolidated status data for the user on the user interface display concurrently with the selectable indicia;

receiving an instruction initiating one or more cloud service applications in accordance with user selection of its associated indicia;

executing each initiated cloud service application in connection with its associated cloud document service;

updating consolidated status data in accordance with each executed cloud service application; and showing updated consolidated status data on the user interface display concurrently with the selectable indicia.

10. The method of claim 9 wherein the plurality of cloud service applications comprise two or more of printing from a cloud service, scanning to a cloud service, faxing to a cloud service and emailing from a cloud service.

11. The method of claim 10 further comprising generating a persistent status bar on the user interface display wherein the consolidated status data is shown in the persistent status bar and updated to show the updated consolidated status data in the persistent status bar.

12. The method of claim 11 wherein each cloud service application is associated with an eApp, and wherein eApps are executed by the user selection of its associated indicia.

13. The method of claim 12 wherein the selectable indicia includes indicia associated each of a plurality of native applications, each native application associated with document processing application completed by the one or more document processing engines, and further comprising:

receiving an instruction initiating one or more native applications in accordance with the user selection of its associated indicia;

executing each initiated native application;

updating the consolidated status data in accordance with each executed native application service application; and showing the updated consolidated status data on the user interface display concurrently with the selectable indicia.

14. The method of claim 13 wherein native applications include one or more of a simple copy, a simple scan, a copy, a scan and a fax.

15. The method of claim 14 wherein the status data comprises one or more of an account balance and document processing quotas associated with the user.

16. The method of claim 15 wherein the updated consolidated status data includes one or more of an updated account balance and updated document processing quotas associated with the user in accordance a cost of an executed cloud application or an executed native application.

17. A non-transitory computer-readable medium comprising instructions stored thereon, that when executed on a processor, perform the steps of:

storing a plurality of cloud service applications in a memory, each cloud service application configured to complete a document processing operation cooperatively between a cloud document service and one or more document processing engines;

showing selectable indicia on a user interface display corresponding to of each of the plurality of cloud service applications;

receiving a login from an associated user via the user interface display;

authenticating a user with each of a plurality of fee based cloud document services via a network interface and its associated cloud service application;

receiving status data associated with the user from an authenticated cloud document service via the network interface;

consolidating the received status data for the user from the authenticated cloud document service; showing consolidated status data for the user on the user interface display concurrently with the selectable indicia;

receiving an instruction initiating one or more cloud service applications in accordance with a user selection of its associated indicia;

executing each initiated cloud service application in connection with its associated cloud document service;

updating consolidated status data in accordance with each executed cloud service application; and showing updated consolidated status data on the user interface display concurrently with the selectable indicia.

18. The non-transitory computer-readable medium of claim 17 further comprising instructions stored thereon, that when executed on the processor, perform the step of generating a persistent status bar on the user interface display wherein the consolidated status data is shown in the persistent status bar and updated to show the updated consolidated status data in the persistent status bar.

19. The non-transitory computer-readable medium of claim 18 wherein the selectable indicia includes indicia associated each of a plurality of native applications, each native application associated with document processing application completed by the one or more document processing engines, and further comprising instructions stored thereon, that when executed on the processor, perform the steps of:

receiving an instruction initiating one or more native applications in accordance with the user selection of its associated indicia;

executing each initiated native application;

updating the consolidated status data in accordance with each executed native application service application; and showing the updated consolidated status data on the user interface display concurrently with the selectable indicia.

20. The non-transitory computer-readable medium of claim 19 the wherein the status data comprises one or more of an account balance and document processing quotas associated with the user.

* * * * *